United States Patent [19]

Inami et al.

[11] Patent Number: 5,066,344
[45] Date of Patent: Nov. 19, 1991

[54] PROCESS FOR PRODUCING AN ENDLESS BELT

[75] Inventors: Junichi Inami, Nara; Koozi Kikuta, Osaka; Satoshi Nakane, Nara; Kazumi Fujito, Osaka; Hitoshi Hirosawa, Kyoto, all of Japan

[73] Assignee: Nitta Industries Corporation, Osaka, Japan

[21] Appl. No.: 479,191

[22] Filed: Feb. 13, 1990

Related U.S. Application Data

[63] Continuation of Ser. No. 159,742, Feb. 24, 1988, abandoned.

[30] Foreign Application Priority Data

Feb. 27, 1987 [JP] Japan ................................ 62-45750
Feb. 27, 1987 [JP] Japan ................................ 62-45751
Feb. 27, 1987 [JP] Japan ................................ 62-45752

[51] Int. Cl.⁵ ............................................. F16G 1/28
[52] U.S. Cl. ................................... 156/138; 156/140; 156/141; 156/245; 264/266; 264/271.1; 264/279.1; 474/266; 474/205; 474/250
[58] Field of Search ................ 156/137, 138, 140, 141, 156/245; 474/271, 266, 251, 250, 205; 425/28.1, 34.2; 264/262, 266, 279, 279.1, 328.3, 271.1, 328.2

[56] References Cited

U.S. PATENT DOCUMENTS

| 3,078,205 | 2/1963 | Sauer et al. | |
| 3,078,206 | 2/1963 | Skura. | |
| 3,937,094 | 2/1976 | Cicognani | 474/205 |
| 3,964,328 | 6/1976 | Redmond | 156/140 X |
| 4,053,547 | 10/1977 | Redmond | 156/138 X |
| 4,066,732 | 1/1978 | Redmond | 156/138 X |
| 4,364,887 | 12/1982 | Becht et al. | 156/140 X |
| 4,392,842 | 7/1983 | Skura et al. | 474/250 X |
| 4,443,396 | 4/1984 | Breher | 264/328.2 X |
| 4,486,375 | 12/1984 | Hirai | 156/140 X |
| 4,614,509 | 9/1986 | Tangorra et al. | 474/205 |

FOREIGN PATENT DOCUMENTS

| 2359216 | 6/1974 | Fed. Rep. of Germany | 156/141 |
| 48-33268 | 10/1973 | Japan. | |
| 49-5912 | 2/1974 | Japan. | |
| 0065644 | 4/1984 | Japan | 474/205 |

Primary Examiner—Michael W. Ball
Assistant Examiner—Jeff H. Aftergut
Attorney, Agent, or Firm—Sixbey, Friedman, Leedom & Ferguson

[57] ABSTRACT

An endless belt comprising a belt main body prepared from a liquid castable elastomeric material, a reinforcing fabric providing over the surface of the main body, and a shock absorbing layer of elastomeric material formed between the main body and the fabric. The belt is in the form of a flat belt or a belt having teeth or projections on at least one side thereof, has improved bending resistance and is operable with diminished noise. The belt is prepareed by a process comprising the steps of forming a shock absorbing layer of elastomeric material over the surface of a reinforcing fabric, fitting the fabric to one of an inner die and an outer die with the layer facing the other die, and pouring or injecting a liquid castable elastomeric material into a space between the fabric and the other die for molding.

15 Claims, 8 Drawing Sheets

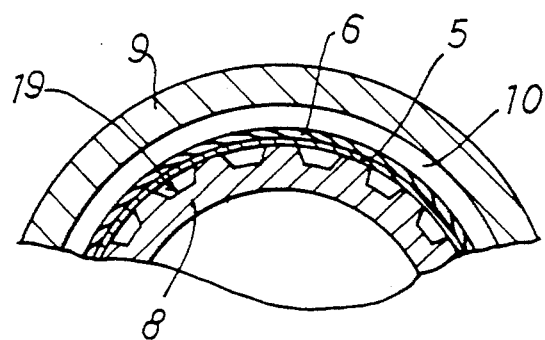
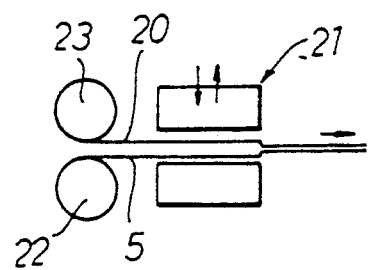
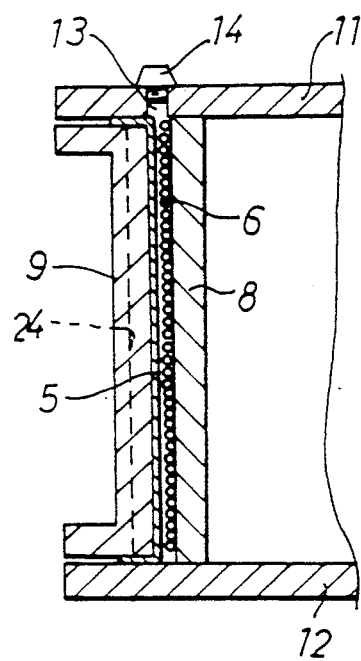
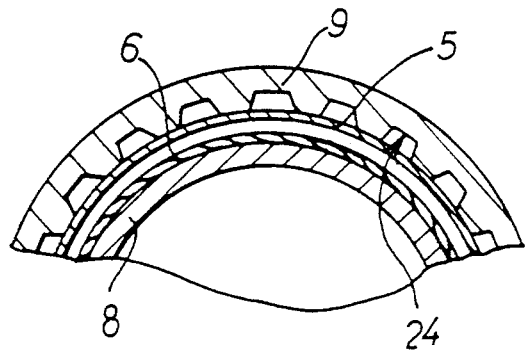
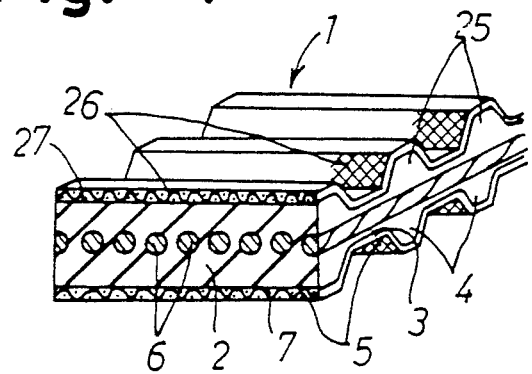
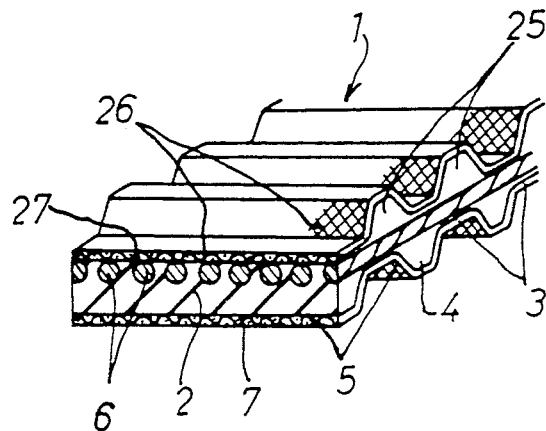

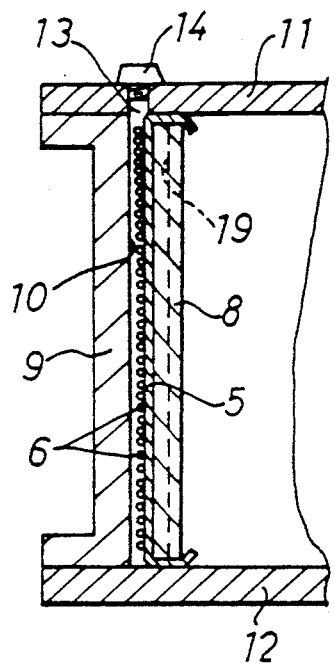
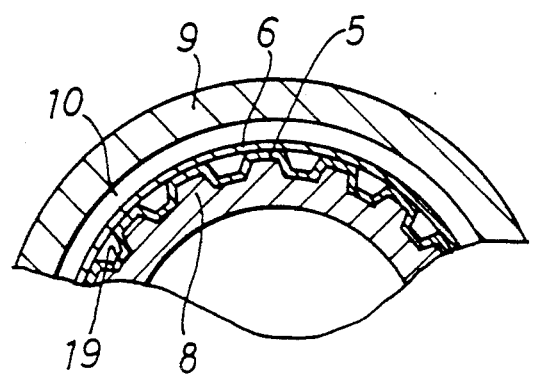
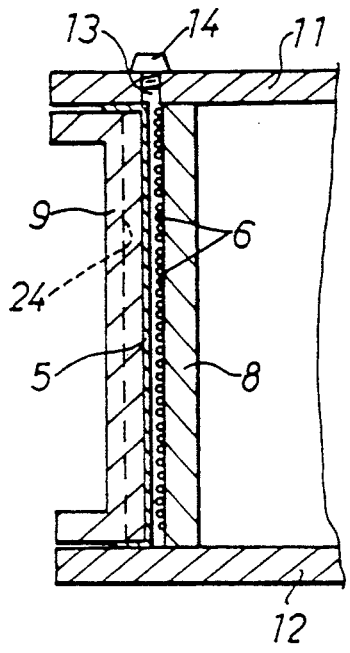
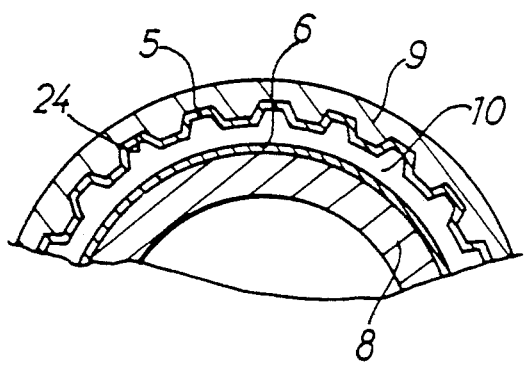
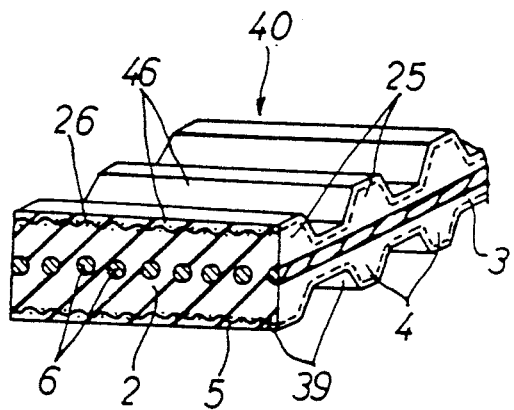

PROCESS FOR PRODUCING AN ENDLESS BELT

This application is a Continuation of Ser. No. 159,742, filed Feb. 24, 1988, now abandoned.

FIELD OF THE INVENTION AND RELATED ART STATEMENT

The present invention relates to endless belts and processes for producing the same.

Endless belts for power transmission and transport include those of various shapes, such as flat belts, belts having projections or teeth and belts of special shape, which are designed for various uses.

For example, toothed endless belts for transmission, which comprise a belt main body and projections or teeth formed integrally therewith, have found use in every field as important means for power transmission. The characteristics of such belts which assure synchronized transmission are indispensable to power transmission systems. Especially, toothed endless belts prepared from a liquid castable elastomeric material such as polyurethane are considered best suited to power transmission systems and transport systems which must be free of contamination with rubber fragments or the like, because of the material used.

With toothed endless belts of polyurethane or the like, problems are encountered when the teeth of such material are merely formed integrally with the belt main body. When meshing with the toothed portion of a pulley, the belt markedly evolves heat due to the frictional resistance involved and has its teeth worn away, hence low durability. The belt has another drawback in that when driven, the meshing engagement between the belt teeth and the teeth of the pulley produces noises.

Accordingly, Examined Japanese Patent Publication SHO 49-5912 proposes an endless belt prepared from polyurethane or like liquid castable elastomeric material and comprising a belt main body and teeth made integrally therewith and covered with a reinforcing fabric over the surface. The reinforcing fabric covering the toothed surface protects the teeth during use, giving the belt increased resistance to shearing and abrasion and therefore improved durability, and also produces a shock absorbing effect during meshing, thereby serving to mitigating heat generation and noises.

However, if the reinforcing fabric is merely provided over the toothed surface, the belt is not fully satisfactory in respect of resistance to bending and reduction of noise, depending on the material and thickness of the fabric. The belt thus still remains to be improved.

Conventional endless belts are molded by pouring or injecting a liquid castable elastomeric material into a die wherein a reinforcing fabric provided along the inner periphery thereof. In this process, the reinforcing fabric is adhered to the toothed surface with the elastomeric material. Nevertheless, the adhesion of the fabric to the toothed surface is low, such that when the belt is used for a prolonged period of time, the fabric is likely to separate off the toothed surface. Further when the surface of the reinforcing fabric is left totally uncovered, the fabric produces a higher shock absorbing effect to diminish heat generation and noises but becomes markedly damaged.

These problems are encountered not only with toothed belts but also with flat belts wherein the belt main body is made of liquid castable elastometic material and covered with a reinforcing fabric, and further with various other belts.

Further toothed endless belts are produced using inner and outer dies and a reinforcing fabric preshaped in conformity with the configuration of the desired toothed portion, by fitting the fabric to the outer periphery of the inner die having indentations for forming the toothed portion, and injecting polyurethane or the like into the space between the two dies, so that the fabric is adhered to the toothed surface. Accordingly, this process has the following problems.

With the conventional process, the preshaped reinforcing fabric must be properly positioned around the indented outer periphery of the inner die. The procedure for winding the fabric around the die is therefore very cumbersome, whereas if the fabric is not properly positioned, the teeth obtained will not be uniform in configuration. When there is a clearance between the die and the fabric, voids are liable to occur, and it becomes difficult to prepare an endless belt free from voids. Further conventionally, the preshaped fabric is merely used which is not treated for filling the openings thereof. Accordingly, polyurethane or like material is likely to penetrate through the fabric to the surface side thereof locally, producing variations locally in the shock absorbing effect to be afforded by the reinforcing fabric and failing to provide a product of uniform quality.

OBJECTS AND SUMMARY OF THE INVENTION

The present invention has been accomplished to overcome the foregoing problems heretofore experienced.

More specifically, a first object of the invention is to provide an endless belt which is operable with less bending fatigue and diminished noise and which has improved bending resistance, and also to provide a process for producing the belt easily.

To fulfill the first object, the invention provides an endless belt including a belt main body prepared from a liquid castable elastomeric material and a reinforcing fabric provided on the surface of the main body, the endless belt being characterized in that a shock absorbing layer of elastomeric material is provided between the main body and the reinforcing fabric. The invention also provides a process for producing the endless belt comprising the step of forming a shock absorbing layer of elastomeric material over the surface of a reinforcing fabric, the step of fitting the reinforcing fabric to one of an inner die and an outer die with the shock absorbing layer facing the other die, and the step of pouring or injecting a liquid castable elastomeric material into a space between the reinforcing fabric and the other die for molding.

A second object of the invention is to provide an endless belt which comprises a reinforcing fabric and a belt main body and wherein the fabric is prevented from separating from the main body and precluded from damage, the belt thus having high durability. The invention also provides a process for producing the belt easily.

To fulfill the second object, the invention provides an endless belt including a belt main body prepared from a liquid castable elastomeric material and a reinforcing fabric provided on the surface of the main body, the endless belt being characterized in that a thin layer is formed on the surface of the reinforcing fabric integrally with the belt main body by causing the liquid castable elastomeric material to penetrate into the fabric. The invention also provides a process for preparing the endless belt comprising the steps of fitting a reinforcing fabric to one of an inner die and an outer die, pouring or injecting a liquid castable elastomeric material into a space between the reinforcing fabric and the other die, and applying a pressure to the liquid castable elastomeric material to force the reinforcing fabric into intimate contact with said one die and to cause the elastomeric material to penetrate into the fabric.

A third object of the invention is to provide a process for forming an endless belt including a belt main body having teeth or like projections integrally formed therewith and a reinforcing fabric provided on the surface of the main body along the projections, wherein the reinforcing fabric to be provided along the projections can be easily and properly fitted to an indented surface of a die for forming the projections.

To fulfill the third object, the present invention provides a process for forming an endless belt comprising fitting a reinforcing fabric to one of an inner die and an outer die which has indentations for forming projections, the reinforcing fabric being stetchable and subjected to an opening filling treatment, fixing the opposite selvages of the fabric, pouring or injecting a liquid castable material into a space between the inner and outer dies and applying a pressure to the liquid castable material to cause the fabric to stretch and extend along the indented surface.

BRIEF DESCRIPTION OF THE DRAWINGS

FIGS. 1 to 5 shows embodiment 1 of the invention;
FIG. 1 is a perspective veiw of a toothed belt;
FIG. 2 is a sectional view of the belt;
FIG. 3 is a sectional view showing a die assembly for producing the belt;
FIG. 4 is an elevation in section showing dies;
FIG. 5 is a plan view in section showing the dies;
FIG. 6 is a diagrm showing embodiment 2 of the invention;
FIG. 7 is an elevation in section showing dies for use in producing embodiment 3 of the invention;
FIG. 8 is a plan view in section showing the same;
FIGS. 9 and 10 are perspective view showing another belt, i.e., embodiment 4 of the invention;
FIGS. 24 to 28 show embodiment 9 of the invention;
FIG. 24 is a perspective view showing the belt, i.e., the same embodiment;
FIG. 25 is an elevation in section showing the same;
FIG. 26 is a diagram illustrating preshaping of a reinforcing fabric;
FIG. 27 is an elevation in section showing dies;
FIG. 28 is a plan view in section showing the dies;
FIG. 29 is a fragmentary sectional view showing dies for embodiment 11 of the invention;
FIG. 30 is a plan view in section of the same;
FIGS. 31 and 32 are perspective views showing another belt, i.e., embodiment 12 of the invention.

DESCRIPTION OF THE PREFERRED EMBODIMENTS

The present invention will be described below with reference to the illustrated preferred embodiments.

EMBODIMENT 1

Figure 1:
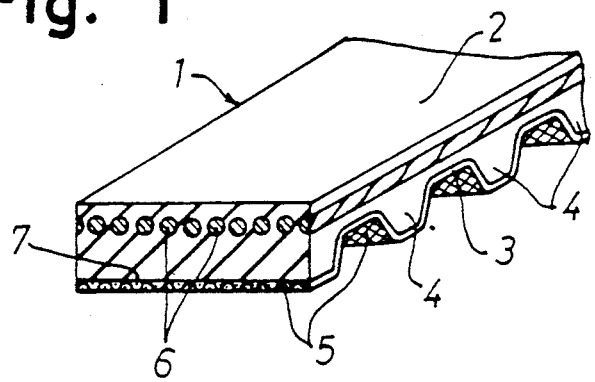
Figure 2:
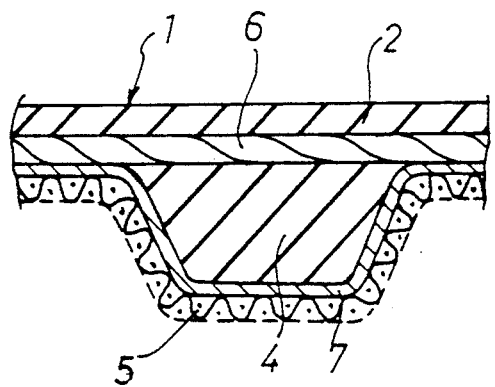

FIG. 1 shows a toothed belt 1 for transmission, which comprises a belt main body 2 and teeth 4 formed integrally therewith on the inner side thereof and spaced equidistantly circumferentially of the body, with land portions 3 interposed between the teeth 4. A reinforcing fabric 5 is provided over the toothed surface. With reference to FIG. 2, the belt body 2 and the teeth are prepared from a liquid castable elastomeric material such as liquid castable polyurethane. The main body 2 has embedded therein a tension material 6 extending helically. As seen in FIG. 2, a shock absorbing layer 7 made of impermeable elastomeric material such as thermoplastic polyurethane is formed between the toothed surface and the fabric 5, has a uniform thickness and extends over the entire inner periphery of the belt main body 2.

Figure 4:
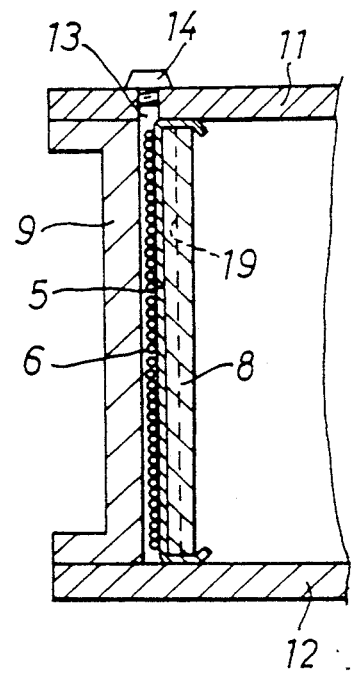
Figure 3:
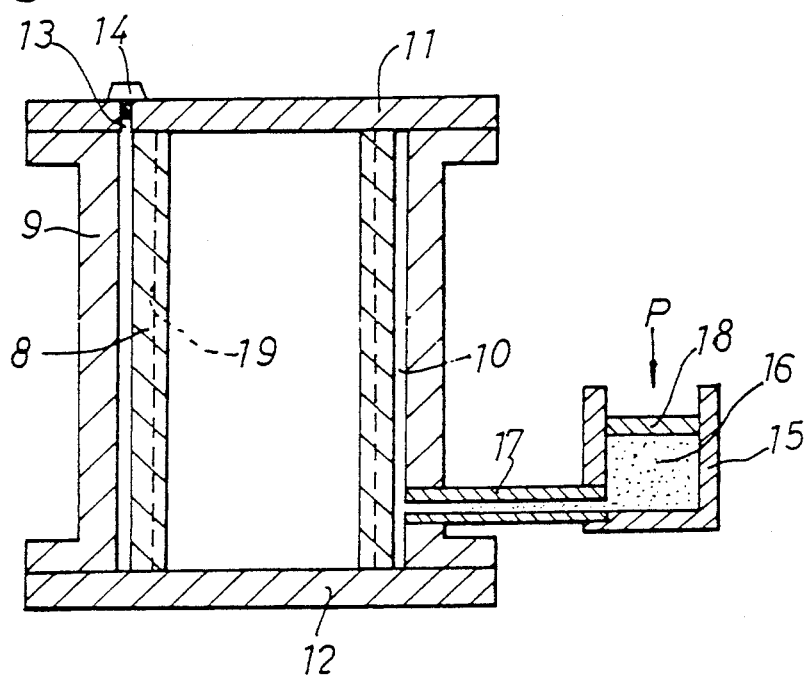

FIG. 3 shows a die assembly for use in producing the toothed belt 1. FIG. 3 shows an inner die 8 and an outer die 9 which are arranged concentrically, with a specified space 10 formed therebetween. The dies are separable from each other. An upper closure 11 and a lower closure 12 are removably attached to the upper and lower ends of these dies 8, 9, respectively for sealing off the space 10 defined by the inner and outer dies 8, 9. The upper closure 11 is formed with an air vent 13 in communication with the space 10. A closing screw 14 is removably screwed into the vent 13. A container 15 containing a castable elastomeric material 16 is connected to the outer die 9 by a duct 17. When a predetermined pressure P is applied to a piston 18, the elastomeric material 16 can be injected into the space 10 between the dies 8, 9 through the duct 17. As shown in FIGS. 4 and 5, indentations 19 for forming the teeth 4 of the belt 1 are formed in the outer periphery of the inner die 8 over the entire circumference.

For producing the toothed belt 1, a stetchable woven nylon fabric, polyester fabric or the like is used as the reinforcing fabric 5. A solution of polyurethane is applied to the fabric (in an amount of 100 to 500 gf/m$^2$ when dried) to close or fill the openings of the fabric, and the shock absorbing layer 7 of specified thickness is formed on the fabric 5. Next, the fabric 5 is cut to a predetermined length, and the length of fabric is made into an endless tubular form as by stitching by a sewing machine, adhesion or fusion with a heat press, or fusion by an ultrasonic machine, welder or high-frequency welder. The fabric 5 is then fitted around the inner die 8, with the shock absorbing layer 7 facing the outer die 9. A tension material 6 is then helically wound around the inner die 8 over the fabric 5. A rope of aromatic polyamide fiber is used as the tension material 6. After the fabric 5 and the material 6 have been completely provided around the inner die 8, the die 8 is inserted into the outer die 9 to form a combination with the specified space 10 provided between the two dies 8, 9. At this time, the selvages of the fabric 5 are folded over the upper and lower ends of the inner die 8 toward the center and clamped between the inner die 8 and the upper and lower closures 11, 12 for fixing. The combination of the dies 8, 9 is heated in its entirety to about 110° C., and pressure P (up to 2 kg f/cm²) is thereafter applied to the elastomeric material 16 within the container 15 by the piston 18, filling the material 16 into the space 10 via the duct 17. The material 16 is a mixture of polyurethane polymer and curing agent and has a viscosity of 2000 to 4000 cps. While filling the space 10, the elastomeric material 16 flows out from the vent 13, whereupon the closing screw 14 is screwed into the vent 13 to close the vent 13. After the space has been sealed off in this way, pressure molding operation at 10 to 30 kg f/cm² and at 110° C. for 60 minutes causes the elastomeric material 16 to apply the pressure to the fabric 5. The material 16 does not penetrate through the fabric 5 toward the inner die 8 since the fabric openings are closed with the shock absorbing layer 7, with the result that the fabric 5 is deformed in conformity with the configuration of the indented outer periphery of the inner die 8 by the pressure while being stretched to properly intimately fit to the inner die outer surface without leaving any clearance. The application of the pressure does not move or displace the fabric 5 because the selvages of the fabric 5 are held clamped between the inner die 8 and the upper and lower closures 11, 12 during the operation. On curing of the material 16, the upper and lower closures 11, 12 are removed, the inner and outer dies 8, 9 are separated to release the molded product, and the product is cut in slices of specified width, whereby toothed belts 1 can be obtained.

The toothed belt 1 thus produced has between the reinforcing fabric 5 and the teeth 4 the shock absorbing layer 7 which is softer or harder than the belt main body 2 and the teeth 4. While the belt is in use, therefore, the shock absorbing layer 7, as well as the fabric 5, produces a cushioning effect to mitigate noises. The presence of the shock absorbing layer 7 also affords improved bending resistance. Even when the shock absorbing layer 7 is hard, the elastomeric material can be prevented from penetrating into the fabric 5 before curing, with the result that when the layer 7 is very thin, the belt exhibits a greater shock absorbing effect and higher bending resistance than when the layer 7 is absent. Further the present of the impermeable shock absorbing layer 7 permits the fabric 5, which is stretchable, to fit to the indented surface (19) of the inner die readily, properly and intimately when the pressure is applied. Consequently, void-free belts can be obtained easily. The shock absorbing layer 7 closing the openings of the fabric 5 precludes the elastomeric material 16 from penetrating into the fabric, eliminating the likelihood of local penetration of the material 16 that would lead to variations in the quality of the product. This facilitates the production procedure and assures the toothed belt 1 of high quality.

The reinforcing fabric 5 may be one prepared by applying a polyurethane solution to an aforementioned fabric material, drying the fabric for opening closing treatment (filling treatment), forming a shock absorbing layer 7 over the resulting fabric and thereafter forming a tooth pattern in conformity with the configuration of the indentations 19 in the inner die 8. The fabric 5 to be prepared before use may have a wave pattern or the like resembling the tooth pattern. The fabric 5 thus prepared can also be intimately fitted to the inner die 8 by the pressure applied for molding since the fabric per se is stretchable. Accordingly, when to be provided around the inner die 8, the fabric 5 need not be completely fitted to the indented surface (19) of the die, hence facilitated work.

The elastomeric material 16 may be filled into the space 10 between the inner and outer dies 8, 9 by injection in a vacuum or pouring at atmospheric pressure instead of using the piston 18.

The molding pressure may be applied for several seconds. More specifically, pressure may be applied until the fabric 5 fits to the indented surface (19) of the inner die 8, and the space 10 may thereafter be maintained in a vacuum or at atmospheric pressure insofar as the reverse flow of the material 16 is prevented.

Further in order to render the fabric 5 readily fittable in the indentations 19 of the inner die 8, the air around the tooth portion may be removed by application of a vacuum through the inner die 8 simultaneously with the application of pressure.

EMBODIMENT 2

The shock absorbing layer 7 is prepared from a film or sheet 20 of polyurethane or the like, which is laminated to the surface of the reinforcing fabric 5 by fusion using a heat press 21 as shown in FIG. 6 for the filling treatment of the fabric. In this case, the fabric 5 and the material 20 are prepared in the form of rolls 22, 23, respectively, from which they are paid off in the direction of arrow shown and laminated as superposed one over the other by the heat press 21. The material 20 is about 0.01 to about 1.00 mm.

EMBODIMENT 3

FIGS. 7 and 8 show a die assembly which comprises an inner die 8 having a smooth-surfaced outer periphery and an outer die 9 with indentations 24 formed in its inner periphery. In this case, a reinforcing fabric 5 is fitted to the outer die inner periphery having the indentations 24, and the selvages of the fabric is fixed by being clamped between the outer die 9 and upper and lower closures 11, 12. A tension material 6 is wound around the inner die 8.

The product molded has teeth 4 and the fabric 5 on its outer periphery. The product is then cut in slices of specified width, and each cut piece obtained is turned inside out, whereby a toothed belt 1 is prepared like the one shown in FIG. 1.

EMBODIMENT 4

FIG. 9 shows a toothed belt 1 of the symmetric type comprising a belt main body 2 and teeth 4 and 25 formed symmetrically on the inner and outer peripheries of the body, respectively. FIG. 10 shows a toothed belt 1 of the asymmetric type having inner teeth 4 and outer teeth 25 which are displaced from the former circumferentially of the belt. These belts 1 also have a shock absorbing layer 7 (27) between a surface covering reinforcing fabric 5 (26) and the teeth 4 (25) and are prepared by the following method.

Figure 11:
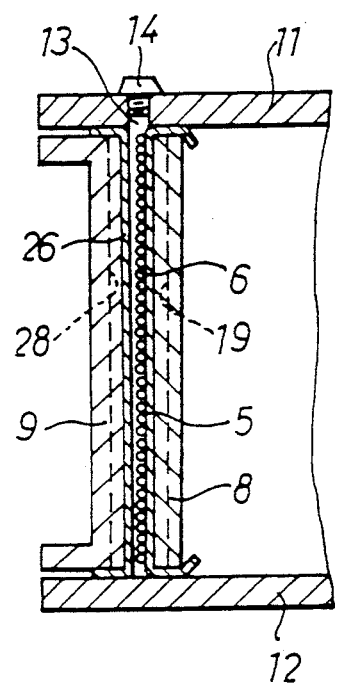
FIG. 11 is an elevation in section showing dies for use in producing the belt.

With reference to FIG. 11, in this case, dies 8, 9 are used which are formed with indentations 19, 28 for forming the teeth 4, 25 respectively. A reinforcing fabric 5 and tension material 6 are wound around the inner die 8, and like fabric 26 is fitted to the inner periphery of the outer die 9. The same work procedure as above thereafter follows.

EMBODIMENT 5

Figure 12:
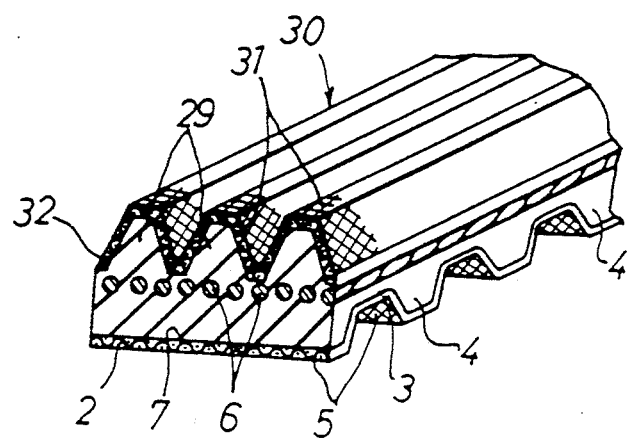
FIG. 12 is a perspective view of another belt, i.e., embodiment 5 of the invention.

FIG. 12 shows a toothed belt 30 comprising a belt main body 2 which is integrally formed with teeth 4 on its inner periphery and V-shaped ridges 29 on its outer periphery. The toothed inner surface of the belt and the outer belt surface having the ridges 29 are covered with reinforcing fabrics 5, 31, respectively, with a shock absorbing layer 7 or 32 formed therebetween.

Figure 13:
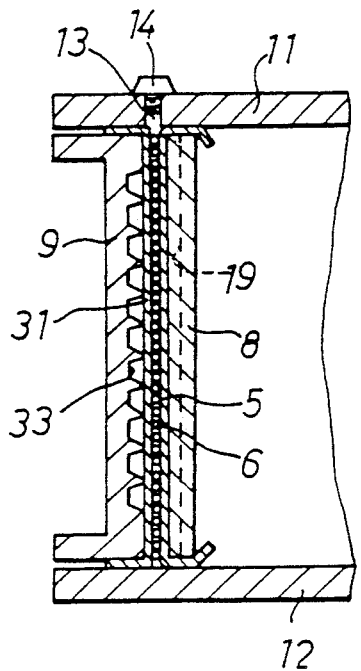
FIG. 13 is an elevation in section showing dies for use in producing the belt.

With reference to FIG. 13, the belt is prepared using an outer die 9 having in its inner periphery indentations 33 for forming the ridges 29, by the same work procedure as embodiment 4.

EMBODIMENT 6

Figure 14:
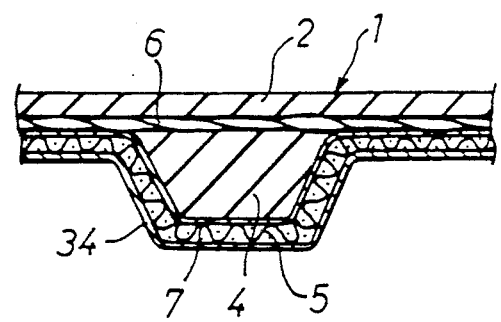
FIGS. 14 and 15 are sectional views showing other belts, i.e., embodiment 7 of the invention.

FIG. 14 shows a toothed belt 1 having a protective film 34 formed over the entire surface of a reinforcing fabric 5, in addition to its shock absorbing layer 7. The protective film 34 may be made of the same material as the layer 7 or a different material.

Figure 15:
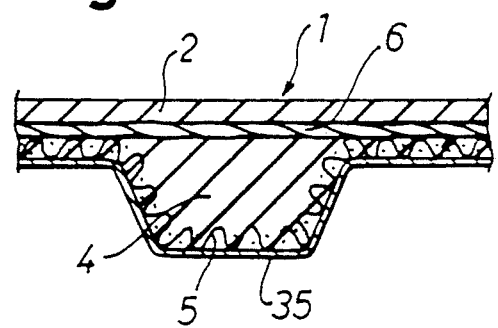

When it is intended to merely render the reinforcing fabric fittable to the die by filling treatment, a film 35 may be formed over the surface of the fabric 5 as seen in FIG. 15. In this case, however, the elastomeric material 16 penetrates into the fabric 5.

EMBODIMENT 7

FIGS. 16 to 20 show embodiments for use as flat belts 36 for transmission or transport. The main body 2 of the belt of FIG. 16 has no tension material 6 therein. The reinforcing fabric 5 used is a woven polyester fabric which is less stretchable and is formed with a shock absorbing layer 7.

Figure 16:
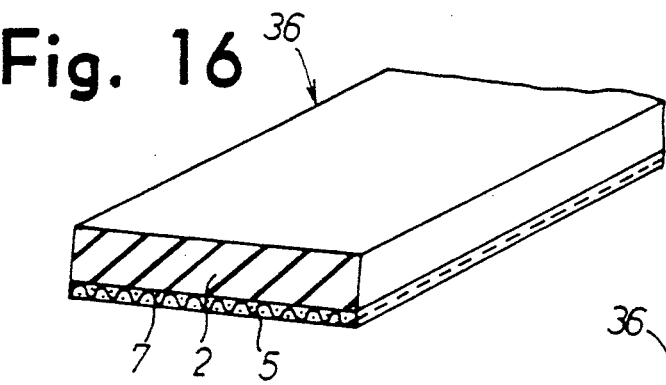
FIGS. 16 to 20 are perspective views showing flat belts, i.e. embodiment 7 of the invention.
Figure 17:
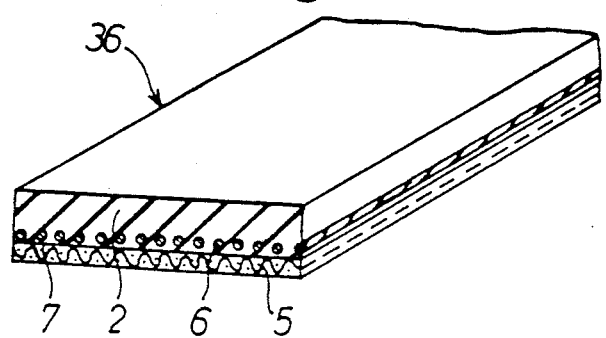

The belt of FIG. 17 has the same construction as the flat belt 36 of FIG. 16 except that the belt main body 2 has a tension material 6 embedded therein.

Figure 18:
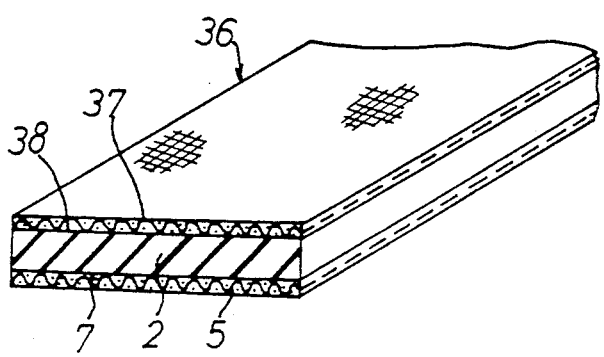

FIG. 18 shows a flat belt 36 wherein the belt main body 2 is provided with reinforcing fabrics 5, 37 on its inner and outer surfaces, respectively. A shock absorbing layer 7 (38) is interposed between the main body 2 and the fabric 5 (37).

Figure 19:
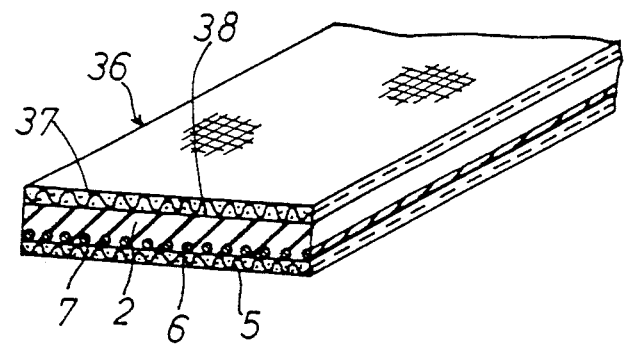

The belt main body 2 of FIG. 19 is provided with reinforcing fabrics 5, 37 over the inner and outer surfaces thereof, respectively, with a shock absorbing layer 7 (38) interposed between the main body 2 and the fabric 5 (37). The belt body 2 has incorporated therein a tension material 6 positioned close to the layer 7.

Figure 20:
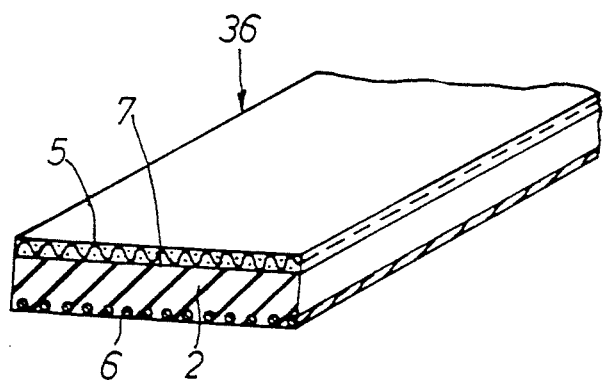

FIG. 20 shows a belt wherein the main body 2 includes a tension material 6 close to its inner periphery and has a shock absorbing layer 7 and a reinforcing fabric over the outer periphery.

These flat belts 36 can be prepared in the same manner as the foregoing embodiments.

In the case of the flat belts 36, an endless hollow weave is usable for the reinforcing fabrics 5, 37.

EMBODIMENT 8

Figure 21:
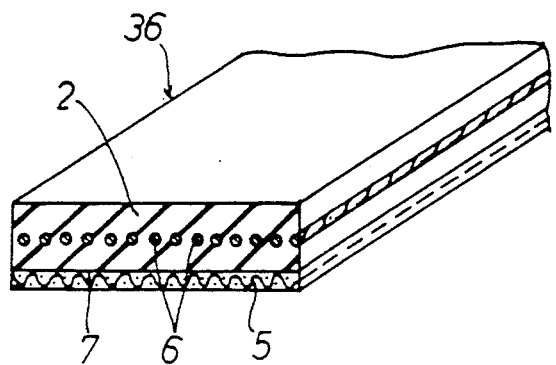
FIG. 21 is a perspective view showing another flat belt as embodiment 8 of the invention.

FIG. 21 shows a flat belt 36 wherein the belt main body 2 has a tension material 6 embedded therein approximately at the midportion its thickness.

Figure 22:
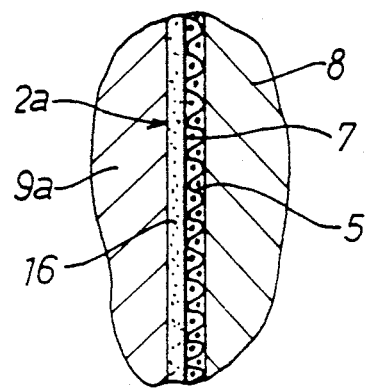
FIGS. 22 and 23 are elevations in section of dies showing a process for producing the same.
Figure 23:
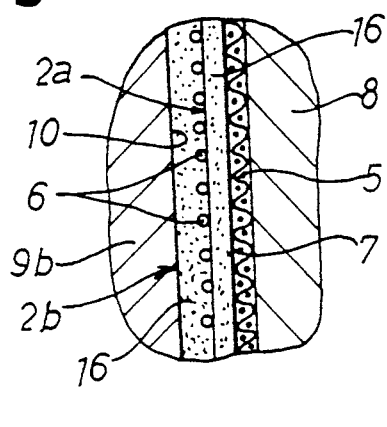

To prepare this belt, a reinforcing fabric 5 formed with a shock absorbing layer 7 is fitted around an inner die 8, an elastomeric material 16 is filled into a space between the fabric and an outer die 9a to form an inner peripheral portion 2a of the belt body 2 first as seen in FIG. 22. The outer die 9a is then removed, a tension material 6 is wound around the portion 2a as formed around the die 8, the resulting assembly is placed into another outer die 9b, and elastomeric material 16 is filled into the space 10 formed to mold an outer peripheral portion 2b integrally with the portion 2a as seen in FIG. 23. In this way, the tension material 6 can be embedded in the belt body 2 at the desired position with respect to the direction of its thickness.

EMBODIMENT 9

Figure 24:
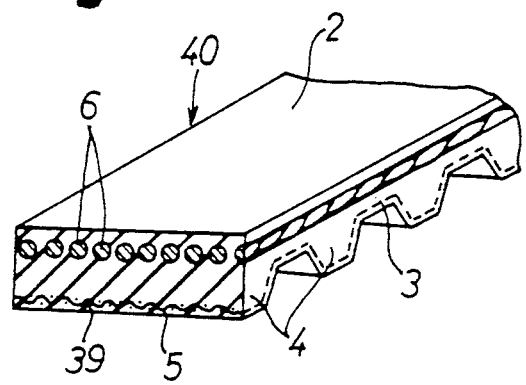
Figure 25:
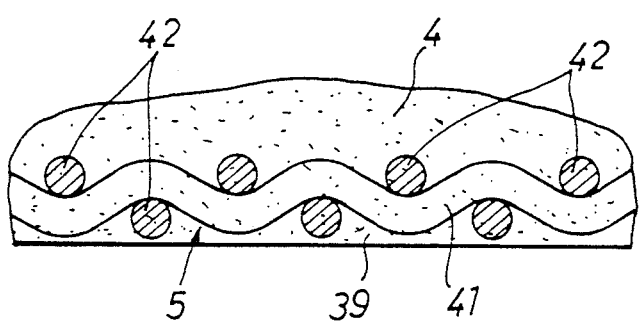

FIG. 24 shows a toothed belt 40 comprising a belt main body 2 and teeth 4 which are made of an elastomeric material 16, and a thin layer 39 formed over the entire surface of a reinforcing fabric 5 by the penetration of the material 16. The teeth 4 are formed integrally with the belt body 2 from the elastomeric material 16. As seen in FIG. 25, the fabric 5 is held adhered with the elastomeric material 16 forming the teeth 4 by the penetration and curing of the material, and the layer 39 is uniformly formed over the entire surface of the fabric 5 integrally with the teeth 4 by the penetration of the material 16. The elastomeric material 16 has fully penetrated into the mesh portions formed by the warps 41 and wefts 42 of the fabric 5 and also into the yarns 41, 42 between their fibers.

Figure 26:
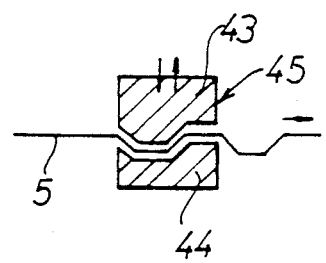

The belt 40 shown in FIG. 24 is produced by the following process. A woven nylon, polyester or like reinforcing fabric 5 is coated with the same material as the liquid castable elastomeric material 16, for example, with a solution of polyurethane, in an amount of about 10 to about 30 g $f/m^2$ when dried, i.e., in such an amount as to enable the fabric to retain the tooth pattern to be formed without filling up the openings thereof. Next, the reinforcing fabric 5 is press-formed to form a tooth pattern using a heat press 45 having a pair of upper and lower dies 43, 44 as seen in FIG. 26, and is thereafter cut to a predetermined size. The cut piece is made into an endless tube by stitching with a sewing machine or adhesion or fusion with a heat press. With reference to FIGS. 27 and 28, the endless fabric 5 is fitted around the inner die 8 of the die assembly in conformity with the configuration of indentations 19, and a tension material 5 is helically wound around the inner die 8 over the fabric 5. The inner die 8 having the fabric 5 and tension material 6 completely fitted thereto is then inserted into the outer die 9, with a specified space 10 formed therebetween. At this time, the selvages of the fabric 5 are folded over the upper and lower ends of the inner die 8 toward its center and clamped between the die 8 and upper and lower closures 11, 12 for fixing. The combination of the dies 8, 9 is heated in its entirety to about 110° C., and pressure P (up to 2 kg $f/cm^2$) is thereafter applied to the elastomeric material 16 within the container 15 by the piston 18, filling the material 16 into the space 10 via the duct 17. The material 16 is a mixture of polyurethane polymer and curing agent and has a viscosity of 200 to 4000 cps. While filling the space 10, the elastomeric material 16 flows out from the vent 13, whereupon the closing screw 14 is screwed into the vent 13 to close the vent 13. A pressure of 10 to 30 kg f/cm$^2$ is applied to the material at 110° C. for 60 minutes for molding. During the pressure molding operation, the reinforcing fabric 5 preshaped to have a tooth pattern is pressed against the inner die 8 by the elastomeric material 16, intimately fitting to the die without any clearance along the indented surface. At the same time, the elastomeric material 16 penetrates into the mesh openings of the fabric to form a thin layer 39 of the material 16 over the entire toothed surface integrally therewith as seen in FIG. 25. After the material 16 has been cured, the upper and lower closures 11, 12 are removed, and the inner and outer dies 8, 9 are separated to release the molded product. The product is then cut into slices of predetermined width, whereby belts 40 can be obtained.

With the belt 40 thus produced, the elastomeric material 16 has penetrated through the reinforcing fabric 5 to the surface side thereof, adhering the fabric 5 to the teeth 4 very effectively, rendering the belt usable for a prolonged period of time without permitting the separation of the fabric 5. The thin layer 39 of elastomeric material 16 covering the surface of the fabric 5 serves to protect the fabric 5, making the fabric less prone to damage. Since the thin layer 39 can be formed simultaneously with the belt body during the application of pressure after the pouring or injection of the material 16, the belt 40 can be produced easily. The reinforcing fabric 5 is brought into intimate contact with the outer periphery of the inner die 8 during the application of pressure. This results in the advantage of precluding formation of air bubbles in the interior die space, rendering the resulting belt free from voids.

While the fabric 5 is treated to have a complete tooth pattern, a wavy pattern or the like resembling the tooth pattern may be given to the fabric.

EMBODIMENT 10

The polyurethane solution is applied to the reinforcing fabric 5 in an increased amount of 30 to 100 g f/m$^2$ when dried, and a lower pressure (2 kg f/cm$^2$) is applied to the elastomeric material 16 injected or poured in and confined in the closed space. The material 16 is maintained at this pressure for 5 to 15 minutes until the viscosity of the material 16 increases to $10^4$ to $10^{10}$ cps and thereafter subjected to a pressure of 10 to 30 kg f/cm$^2$ at 110° C. for 45 to 55 minutes for molding.

This method slightly diminishes the penetration of the elastomeric material 16 into the reinforcing fabric 5, producing a thin layer 39 on the surface of the fabric 5 locally. However, this embodiment is equivalent or nearly equivalent to embodiment 9 with respect to the adhesion of the fabric 5, etc.

EMBODIMENT 11

FIGS. 29 and 30 show a die assembly which comprises an inner die 8 having a smooth-surfaced outer periphery and an outer die 9 formed with indentations 24 in its inner peripheral surface. With this assembly, the reinforcing fabric 5 is fitted to the indented inner surface of the outer die 9, and the selvages of the fabric are clamped between the upper and lower ends of the outer die 9 and upper and lower closures 11, 12, respectively. On the other hand, the tension material 6 is wound around the inner die 8.

The molded product obtained has teeth 4 and fabric 5 on the outer periphery. The product is then cut in slices of specified width, and each cut piece is turned inside out. Thus, belts having the same construction as the belt 40 shown in FIG. 24 are produced.

EMBODIMENT 12

Figure 32:
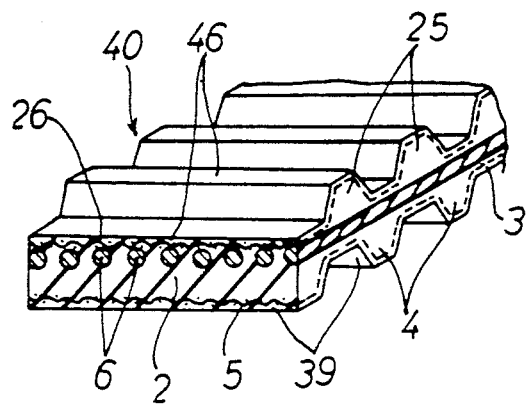

FIG. 31 shows a toothed belt 40 of the symmetric type comprising a belt main body 2 and teeth 4, 25 formed symmetrically on the inner and outer peripheries of the belt body, respectively. FIG. 32 shows a toothed belt 40 of the asymmetric type having inner teeth 4 and outer teeth 25 which are displaced from the former circumferentially of the belt. These belts 40 also have a reinforcing fabric 5 (26) covering each toothed surface and a thin layer 39 (46) over the surface of the fabric 5 (26). These belts are prepared by the following process.

Figure 33:
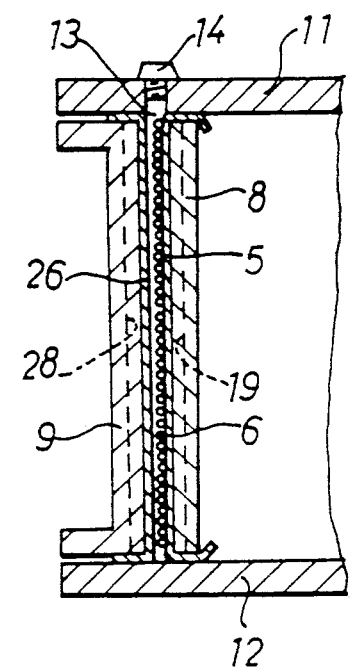
FIG. 33 is an elevation in section showing dies therefor.

FIG. 33 shows the inner and outer dies 8, 9 to be used in this case and provided with indentations 19, 28 for forming the teeth 4, 25, respectively. A reinforcing fabric 5 and tension material 6 are wound around the inner die 8, and like fabric 26 is fitted to the inner periphery of the outer die 9. The same work procedure as already stated thereafter follows.

EMBODIMENT 13

Figure 34:
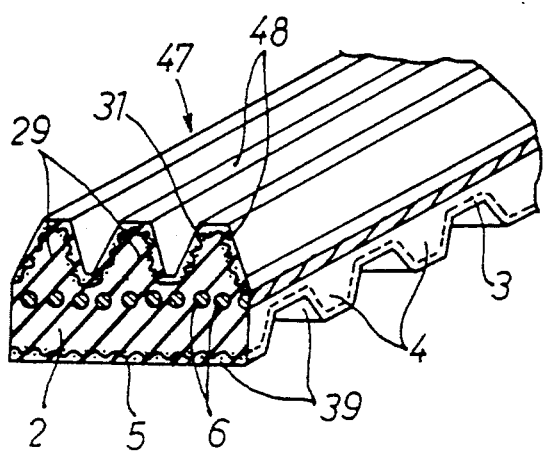
FIG. 34 is a perspective view of another belt, i.e., embodiment 13 of the invention.

FIG. 34 shows a toothed belt 47 comprising a belt main body 2 which is integrally formed with teeth 4 on its inner periphery and V-shaped ridges 29 on its outer periphery. The toothed inner surface of the belt and the outer belt surface having the ridges 29 are covered with reinforcing fabrics 5, 31, respectively, which are formed with a thin layer 5 or 48 over the surface of the fabric.

Figure 35:
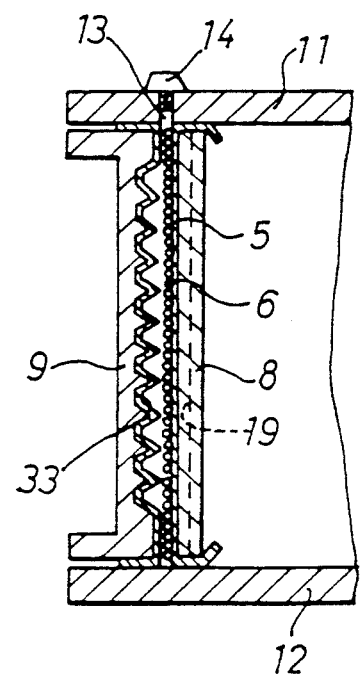
FIG. 35 is an elevation in section showing dies therefor.

With reference to FIG. 35, the belt is prepared using an outer die 9 having in its outer periphery indentations 33 for forming the ridges 29, by the same work procedure as embodiment 12.

EMBODIMENT 14

Figure 36:
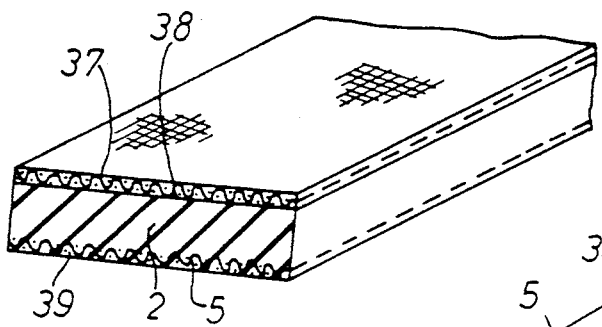
FIGS. 36 to 38 are perspective views showing other flat belts, i.e., embodiment 14 of the invention.
Figure 37:
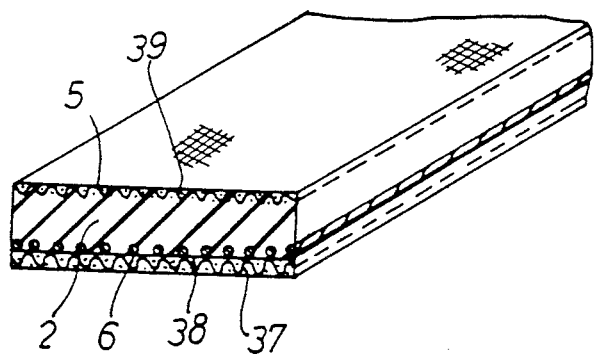
Figure 38:
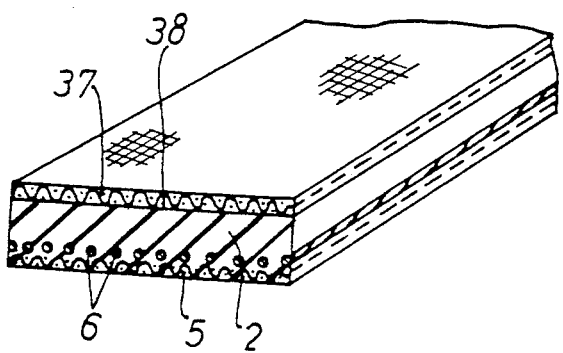

The endless belt having a thin layer 39 on the surface of the reinforcing fabric 5 can be in the form of a flat belt, V belt or the like. For example, the belts shown in FIGS. 16 to 20 can be so constructed when not having the shock absorbing layers 7, 38. Further as shown in FIGS. 36 to 38, the thin layer may be present in combination with the shock absorbing layer. More specifically stated, FIG. 36 shows a belt wherein a thin layer 39 is formed over the surface of a reinforcing fabric 5 along the inner periphery of the belt main body 2, and a shock absorbing layer 38 is interposed between the belt body 2 and a reinforcing fabric 37 along the inner periphery of the body 2.

FIG. 37 shows a belt which is in reverse inside-outside relation to the flat belt of FIG. 36. The belt main body 2 has a tension material 6 incorporated therein.

FIG. 38 shows a belt having the same construction as the flat belt of FIG. 36 except that the belt main body 2 has a tension material 6 incorporated therein.

With the flat belts shown in FIGS. 36 to 38, one of the fabrics 5, 37, i.e. the fabric 37, is exposed, while the other fabric 5 is covered with the thin layer 39. Accordingly, the belt inner and outer surfaces differ in coefficient of friction, rendering the belt very convenient to use for transport and other applications.

While various embodiments of the invention have been described above, useful materials for the belts of the invention are as follows.

Examples of useful reinforcing fabrics are woven fabrics cut bias, woven fabrics formed by highly stretchable yarns, nonwoven fabrics, etc. Examples of useful woven fabrics are in the form of plain weave, twill weave, satin weave and the like prepared from yarns of elastic fibers, rubber yarns and crimped yarns.

For the filling treatment, a suitable method is used in view of the bending resistance of the reinforcing fabric and reduced likelihood of producing noises. Useful materials for the treatment are polyurethane solutions, and polyurethane or like films or sheets which may be finely porous. While the same material as the elastomeric material 16 is useful, other materials which can be adhered are usable.

Examples of liquid castable elastomeric materials 16 are polyurethane polymer and like thermosetting liquid resins, liquid rubbers, plastisols, molten thermoplastic resins, etc. The hardness of the liquid castable elastomeric material as cured in the form of a product is suitably 70 to 100 degrees in JIS A hardness. The hardness may be in the range of durometer A20 to durometer D80.

Examples of useful tension materials 6 are ropes of synthetic fibers, such as aromatic polyamide, nylon, polyester and like fibers, steel wires, etc.

Figure 39:
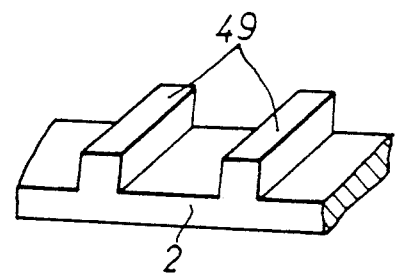
FIGS. 39 to 41 are perspective views showing belts with projections.
Figure 40:
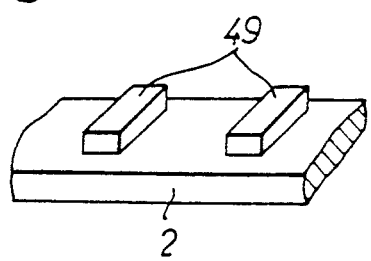
Figure 41:
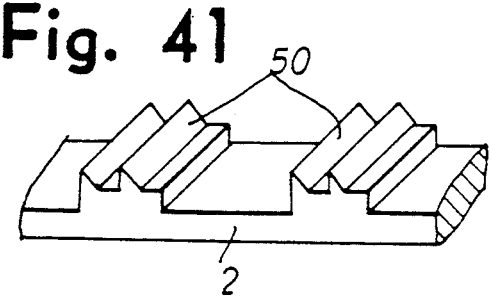

The endless belts of the invention are not limited to the foregoing embodiments in construction and configuration but can be various insofar as the belt main body 2 has a reinforcing fabric. For example, the invention can be embodied as endless belts for transport, such as those shown in FIGS. 39 and 40, in which the belt main body 2 has a multiplicity of widthwise projections 49 formed on its outer periphery and arranged at a specified spacing along the periphery, so as to transport articles in engagement with the projections 49. FIG. 41 shows another example, wherein sawtooth projections 50 are provided on the outer periphery of the belt main body 2.

When the reinforcing fabric is provided as exposed, the surface of the fabric can be covered with a layer of silicone, fluorocarbon resin or like synthetic resin or elastomer. The coefficient of friction of the fabric surface can then be varied as desired, rendering the belt applicable to wider use.

What is claimed is:

1. A process for producing an endless belt including a belt main body prepared from a liquid castable elastomeric material and a reinforcing fabric provided on a surface of the main body, wherein the process comprises: forming a liquid impermeable shock absorbing layer made of an elastomeric material on an inner surface of the reinforcing fabric; fitting the reinforcing fabric in a first mold die with the impermeable shock absorbing layer being exposed to another mating mold die; forming an interspace between the fitted reinforcing fabric and the mating mold die; injecting the liquid castable elastomeric material at a pressure of up to 2 kg f/cm²; and after filling of said interspace, applying a pressure to the injected material of from 10 to 30 kg f/cm² to firmly press the reinforcing fabric onto the first mold die without the cast elastomeric material permeating the reinforcing fabric.

2. A process for producing an endless belt as defined in claim 1, wherein the impermeable shock absorbing layer is formed on the fabric by coating of a liquid elastomeric material.

3. A process for producing an endless belt as defined in claim 1, wherein the impermeable layer is formed on the fabric by thermally bonding of a film or sheet made from an elastomeric material to the fabric.

4. A process as defined in any one of claims 1-3 wherein the first mold die to which the reinforcing fabric is fitted to is one of inner and outer dies and has indentations for forming projections or teeth on the main body of the belt.

5. A process for producing an endless belt according to claim 1, wherein said interspace communicates with an air-outlet vent; wherein said injecting step is performed with said air-outlet vent open; and wherein said air-outlet vent is closed prior to applying of said pressure of 10 to 30 kg f/cm².

6. A process for producing an endless belt including a belt main body prepared from a liquid castable elastomeric material and a reinforcing fabric provided on a surface of the main body, wherein the process comprises: fitting the reinforcing fabric into a first mold die; forming an interspace between the fitted reinforcing fabric and another mating mold die; injecting a liquid castable elastomeric material into the interspace at a pressure of up to 2 kg f/cm²; and after filling of said interspace, applying a pressure to the injected material of from 10 to 30 kg f/cm² to press the fabric onto the first mold die and cause the cast elastomeric material to permeate through the reinforcing fabric to form a thin layer on an outer surface of the fabric.

7. A process as defined in claim 6, wherein the first mold die into which the reinforcing fabric is fitted is one of inner and outer dies and has indentations for forming projections or teeth on the belt main body.

8. A process as defined in claim 6 or 7, wherein the inner die has said indentations in its outer periphery, and wherein said process further comprises the steps of winding the reinforcing fabric around the inner die and winding a tension material around the inner die over the fabric.

9. A process as defined in claim 6 or 7, wherein the outer die has said indentations in its inner periphery, and wherein said process further comprises the steps of fitting the reinforcing fabric to the inner periphery of the outer die and winding a tension material around the inner die.

10. A process for producing an endless belt according to claim 6, wherein said interspace communicates with an air-outlet vent; wherein said injecting step is performed with said air-outlet vent open; and wherein said air-outlet vent is closed prior to applying of said pressure of 10 to 30 kg f/cm².

11. A process for producing an endless belt having teeth formed integrally with a main portion of the belt on one side thereof, and having a reinforcing fabric covering the teeth following the configuration thereof, wherein the process comprises; filling openings of the fabric with a material that is crosslinkable with or otherwise adherent to the castable elastomeric material to form an approximately even flexible membrane over a side of the fabric; fitting the reinforcing fabric in a mold with the membrane in contact with a first mold die which will define tooth projections, and fixing the reinforcing fabric at two opposite sides of said first mold die, keeping the fabric stretchable; injecting the liquid castable elastomeric material into an interspace formed between the first mold die and a second mold die at a pressure of up to 2 kg f/cm²; and after filling of said interspace, raising said pressure to from 10 to 30 kg f/cm² to thereby outwardly dilate the fabric so as to intimately follow the configuration of the first mold die.

12. A process as defined in claim 11, wherein said first mold die is an inner die having indentations formed in the outer periphery thereof and wherein said process further comprises the steps of winding the reinforcing fabric around the inner die and winding a tension material around the inner die over the fabric.

13. A process as defined in claim 11, wherein said first mold die is an outer die having indentations formed in the inner periphery thereof and wherein said process further comprises the steps of fitting the reinforcing fabric to the inner periphery of the outer die and winding a tension material around the inner die.

14. A process as defined in one of claims 11 or 12 or 13, wherein opposite selvages of the reinforcing fabric are fixed by being clamped between said first mold die and closures closing the opposite ends of the mold dies.

15. A process for producing an endless belt according to claim 11, wherein said interspace communicates with an air-outlet vent; wherein said injecting step is performed with said air-outlet vent open; and wherein said air-outlet vent is closed prior to applying of said pressure of 10 to 30 kg f/cm$^2$.

* * * * *